United States Patent
Cummins et al.

(10) Patent No.: US 6,247,003 B1
(45) Date of Patent: Jun. 12, 2001

(54) CURRENT TRANSFORMER SATURATION CORRECTION USING ARTIFICIAL NEURAL NETWORKS

(75) Inventors: James C. Cummins, Greendale; David C. Yu, Mequon; David T. Stone, Milwaukee; Ljubomir A. Kojovic, Racine, all of WI (US)

(73) Assignee: McGraw-Edison Company, Houston, TX (US)

( * ) Notice: Subject to any disclaimer, the term of this patent is extended or adjusted under 35 U.S.C. 154(b) by 0 days.

(21) Appl. No.: 09/275,388

(22) Filed: Mar. 24, 1999

Related U.S. Application Data

(60) Provisional application No. 60/096,459, filed on Aug. 13, 1998.

(51) Int. Cl.[7] .................................................. G06N 3/02
(52) U.S. Cl. .................... 706/22; 700/48; 361/36
(58) Field of Search .............................. 706/22, 15, 16; 700/48; 361/36

(56) References Cited

U.S. PATENT DOCUMENTS

| | | |
|---|---|---|
| 4,946,393 | 8/1990 | Borgstrom et al. . |
| 5,082,449 | 1/1992 | Borgstrom et al. . |
| 5,258,903 | 11/1993 | Rodriguez-Cavazos . |
| 5,450,315 * | 9/1995 | Stefanski ............................... 700/48 |
| 5,485,545 | 1/1996 | Kojima et al. . |
| 5,537,327 | 7/1996 | Snow et al. . |
| 5,574,387 | 11/1996 | Petsche et al. . |
| 5,576,632 | 11/1996 | Petsche et al. . |
| 5,629,870 | 5/1997 | Farag et al. . |
| 5,675,497 | 10/1997 | Petsche et al. . |
| 5,714,886 | 2/1998 | Harris . |
| 5,726,847 | 3/1998 | Dalstein . |
| 5,734,575 | 3/1998 | Snow et al. . |
| 5,784,233 * | 7/1998 | Bastard et al. . |
| 5,796,631 | 8/1998 | Iancu et al. . |
| 5,805,400 | 9/1998 | Kim . |

OTHER PUBLICATIONS

An Algorithm for Compensating Secondary Currents of Current Transformers, IEEE Transaction on Power Delivery, vol. 12, No. 1, Jan. 1997, Y.C. Kang et al., pp. 116–124.

Experimental Evaluation of EMTP–Bsed Current Transformer Models for Protective Relay Transient Study, IEEE Transaction on Power Delivery, vol. 9, No. 1, Jan. 1994, M. Kezunovic et al., pp. 405–413.

Current Transformer Burden and Saturation, IEEE Transaction on Industry Applications, vol. 1A–15, No. 3, May/Jun. 1979, Louie J. Powell, Jr., pp. 294–303.

Relay Performance Considerations with Low Ratio CTS and Hight Fault Currents, IEEE Transactions on Power Delivery, vol. 8, No. 3, Jul. 1993, C.W. Barnett et al., pp. 884–897.

(List continued on next page.)

Primary Examiner—Mark R. Powell
Assistant Examiner—Wilbert Starkes
(74) Attorney, Agent, or Firm—Fish & Richardson P.C.

(57) ABSTRACT

A method and apparatus of correcting for saturation in a current transformer, which outputs a current measurement, is provided. A switching algorithm receives a value of the current measurement from the current transformer and determines within which of three ranges the value falls. If the value falls in a first range, the current measurement is provided to a protective device such as a relay. If the value falls in a second range, the current measurement is provided to an artificial neural network that produces an output that accounts for saturation of the current transformer. If the value falls in a third range, the current measurement is provided to another artificial neural network that produces an output that accounts for saturation of the current transformer.

27 Claims, 14 Drawing Sheets

OTHER PUBLICATIONS

Neural Networks for Combined Control of Capacitor Banks and Voltage Regulators in Distribution Systems, IEEE Transactions on Power Delivery, vol. 11, No. 4, Oct. 1996, Z. Gu, et al., pp. 1921–1928.

Weather Sensitive Short–Term Load Forecasting Using Nonfully Connected Artificial Neural Network, Transactions on Power Systems vol. 7, No. 3, Aug. 1992, Shin–Tzo Chen et al., pp. 1098–1105.

Electric Load Forecasting Using an Artificial Neural Network, IEEE Transactions on Power Systems, vol. 6, No. 2, May 1991, D.C. Park et al., pp. 442–449.

Gapped Core Current Transformer Characteristics and Performance, IEEE Transactions on Power Delivery, vol. 5, No. 4, Nov. 1990, pp. 1732–1740.

Methods for Estimating Transient Performance of Practical Current Transformers for Relaying, E.E. Conner, pp. 116–122.

Cozzio, R. et al., "Neural Signal Processing Networks For Electric Power Distribution System Control", Mar. 1994, Switzerland, vol. 85, No. 7, pp. 23–29m (English Abstract–1 page).

Yu, D.C.; Cummins, J.C.; Wang, Z.; Hong–Jun Yoon; Kojovic, L.A.; Stone, D., Neural network for current transformer saturation correction, Transmission and Distribution Conference, 1999 IEEE vol.:1 , 11–16 Apr. 1999, p.(s); 441 –446 vol. 1.*

Bastard, P.; Meunier, M.; Regal, H., Neural network–based algorithm for power transformer differential relays, Generation, Transmission and Distribution, IEE Proceedings vol. 142 4, Jul. 1995, p.(s): 386 –392.*

Cummins, J.C.; Yu, D.C.; Kojovic, L.A., Simplified artificial neural network structure with the current transformer stauration detector provides a good estimate of primary currents, Power Engineering Society Summer Meeting, 2000. IEEE vol.: 3 , 16–20, Ju Jul. 2000.*

Pihler, J.; Grcar, B.; Dolinar, D., Improved operation of power transformer protection using artificial neural network, Power Delivery, IEEE Transactions on vol. 12 3 , Jul. 1997, p.(s): 1128 –1163.*

Bo, Z.Q.; Wang, G.S.; Wang, P.Y.; Weller, G., Non–differential protection of generator using fuzzy neural network, Power System Technology, 1998. Proceedings POWERCON '98 International Conference on, vol.:2 , 18–21 Aug. 1998, p.(s): 1072 –1076.*

* cited by examiner

CURRENT TRANSFORMER SATURATION CORRECTION USING ARTIFICIAL NEURAL NETWORKS This application claims priority from provisional application Ser. No. 60/096,459, filed Aug. 13, 1998.

TECHNICAL FIELD

This invention relates to correcting for current transformer signal distortions.

BACKGROUND

Iron-core toroidal current transformers (CTs) are widely used in the electric power industry to measure line current for protection and metering purposes. The line current is applied to a primary coil of the CT, and a reduced-magnitude version of the line current is produced on a secondary coil of the CT. This reduced-magnitude version of the line current is used as a measurement for protection and metering purposes.

One advantage of using an iron core CT is that most of the magnetic flux produced by a current in the primary winding passes through the secondary winding. Thus, iron-core CTs provide good flux linkage between the primary and secondary windings. Other advantages of using an iron-core toroidal CT include low production cost, inherent galvanic isolation, reliability, and ease of application.

However, a major disadvantage of iron-core toroidal CTs is that they are prone to current saturation. Such saturation occurs when currents exceeding a dynamic operating range of the CT cause magnetization of the core to be independent of the current, and thus produce distortion in the secondary signal. Saturation in these CTs is due mainly to two factors. First, the relationship between a magnetizing current (i.e., a current which produces the flux required to induce a voltage for transformer action) and a voltage applied to the secondary winding is non-linear. Second, iron-core toroidal CTs are able to retain a large magnetic flux density, or remanence, in their cores after removal of a current applied to the primary winding.

SUMMARY

The invention provides techniques for correcting for saturation in a current transformer used to provide a current measurement. To this end, a current measurement received from a current transformer is provided to an artificial neural network. The artificial neural network is trained to implement an inverse transfer function of the current transformer and produces an output that accounts for saturation of the current transformer.

Embodiments may include one or more of the following features. For example, the output of the artificial neural network may be converted to a projected current measurement using an ideal transfer function for the current transformer. The projected current measurement is provided to a protective device which signals a relay to trip if the projected current measurement is greater than a predetermined value.

The current measurement may be provided to one of two artificial neural networks, with the particular artificial neural network used depending on whether the current measurement is greater than a predetermined threshold. Both artificial neural networks are trained to implement inverse transfer functions of the current transformer, but under different operating conditions (e.g., different current levels).

The artificial neural network may be bypassed if the current measurement is less than a first threshold. When the artificial neural network is bypassed, the current measurement may be provided directly to a protective device which signals a relay to trip if the current measurement is greater than a predetermined value.

The artificial neural network may be trained using data from Electro Magnetic Transient Program simulations. The artificial neural network also may be trained using data from actual current transformers.

The current measurement from the current transformer may be converted into a sequence of digital samples. An input of the artificial neural network may be a digital sample from a current cycle. Another input of the artificial neural network may be based on digital samples from a previous current cycle.

The current measurement may be monitored to determine within which of several ranges the measurement falls. If the measurement falls in a first range, the artificial neural network may be bypassed and the current measurement may be provided directly to a protective device. If the measurement falls in a second range, the current measurement may be provided to a first artificial neural network. If the measurement falls in a third range, the current measurement may be provided to another artificial neural network.

Other features and advantages will be apparent from the following description, including the drawings, and from the claims.

DETAILED DESCRIPTION

In many electric power designs, a current transformer (CT) is an integral part of a protective device that detects and responds to current faults on a power line. If a fault includes a significant DC offset superimposed on a symmetrical current, the CT may saturate at an unusually low current. Both electromechanical and electrical protective devices often make operating decisions based on a root mean square (RMS) value of a fault current. If the signal supplied by the CT to the protective device is distorted by saturation, the RMS value sensed may be different than the actual fault current.

Figure 1A:
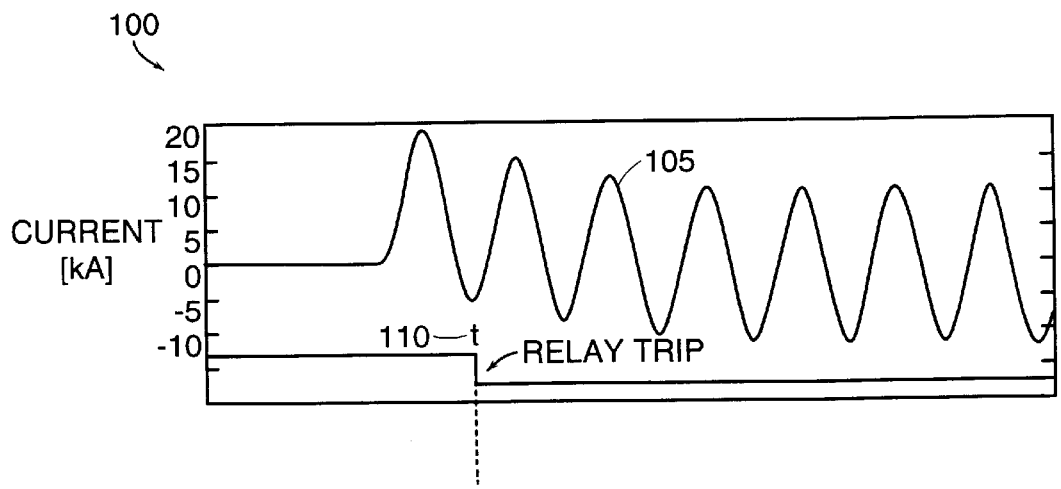
FIG. 1 includes two graphs illustrating effects of current saturation in a current transformer (CT) on tripping of a relay.
Figure 1B:
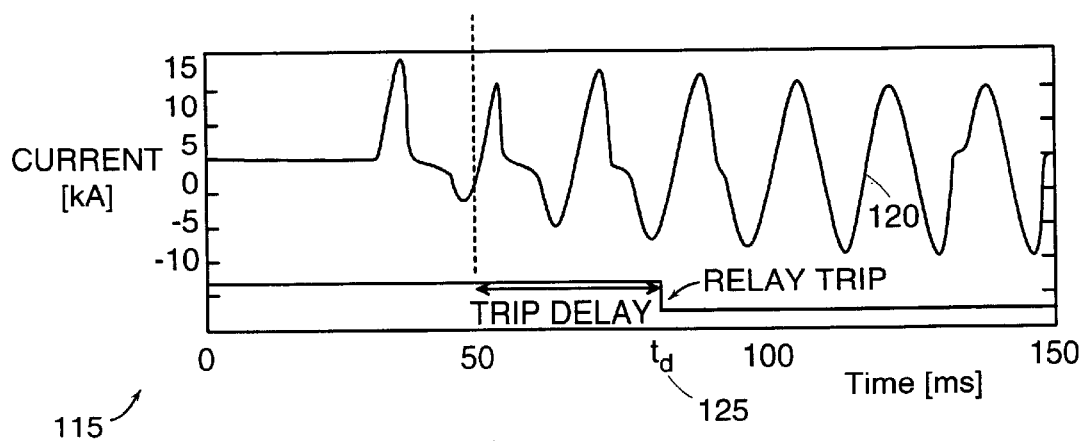

FIG. 1 shows a comparison between timing of tripping of a relay of a protective device when a CT is saturated or unsaturated. Both graphs display a CT current measurement in kiloAmps versus time in milliseconds. In the top graph 100, the CT is not saturated, and the current measurement 105 accurately reflects the line current. A relay trips in response to the current measurement at a time t (110) approximately three quarters of a cycle after the excess current begins. In the bottom graph 115, the CT is saturated such that the measured current 120 does not accurately reflect the primary current (as indicated by measured current 105). As a result of this saturation, the RMS value of the measured current does not reach a value sufficient to trip the relay until a time $t_d$ (125), which is delayed relative to t (110) by approximately two cycles. This delay may cause miscoordination with other devices in the system. Furthermore, CT saturation may prevent relay tripping altogether, or may cause false tripping.

There are several ways to avoid CT saturation. For example, the size of the CT core may be increased to change the mutual inductance between the coils. Alternately, another core material which supports larger flux densities may be used. However, both options may increase the cost and complexity of protective device implementation.

Another way to address CT saturation is to correct for the CT saturation using an artificial neural network (ANN). An ANN includes one or more nodes, or simple processors, which communicate with each other through channels. Typically, a node includes memory and implements a transfer function such that an output of the node is a function of one or more of its current or former inputs. A node receives input data, typically in the form of numerical data, through one or more input channels and operates on this input data using the transfer function. A node provides data to one or more channels within the ANN or to an output channel of the ANN.

The transfer functions of the nodes of an ANN are established through a training process. ANNs are able to generalize beyond the data used in the training.

The overall function of the ANN is dependent on the structure of the nodes and channels, the strengths of the channels, and the processing at each node. Additional information about ANNs may be found at the Neural Network FAQ, Sarle, W. S., ed. (1997), periodic posting to the Usenet newsgroup comp.ai.neural-nets, URL: ftp://ftp.sas.com/pub/neural/FAQ.html.

The ANN is trained to provide the inverse of a transfer function of the CT. The ANN is then used to process the output (secondary current) from the CT to provide an estimate of the input (primary current) of the CT. One implementation of the ANN has been developed using MATLAB and trained using data generated from Electro Magnetic Transient Program (EMTP) simulations and from actual CTs.

Figure 2:
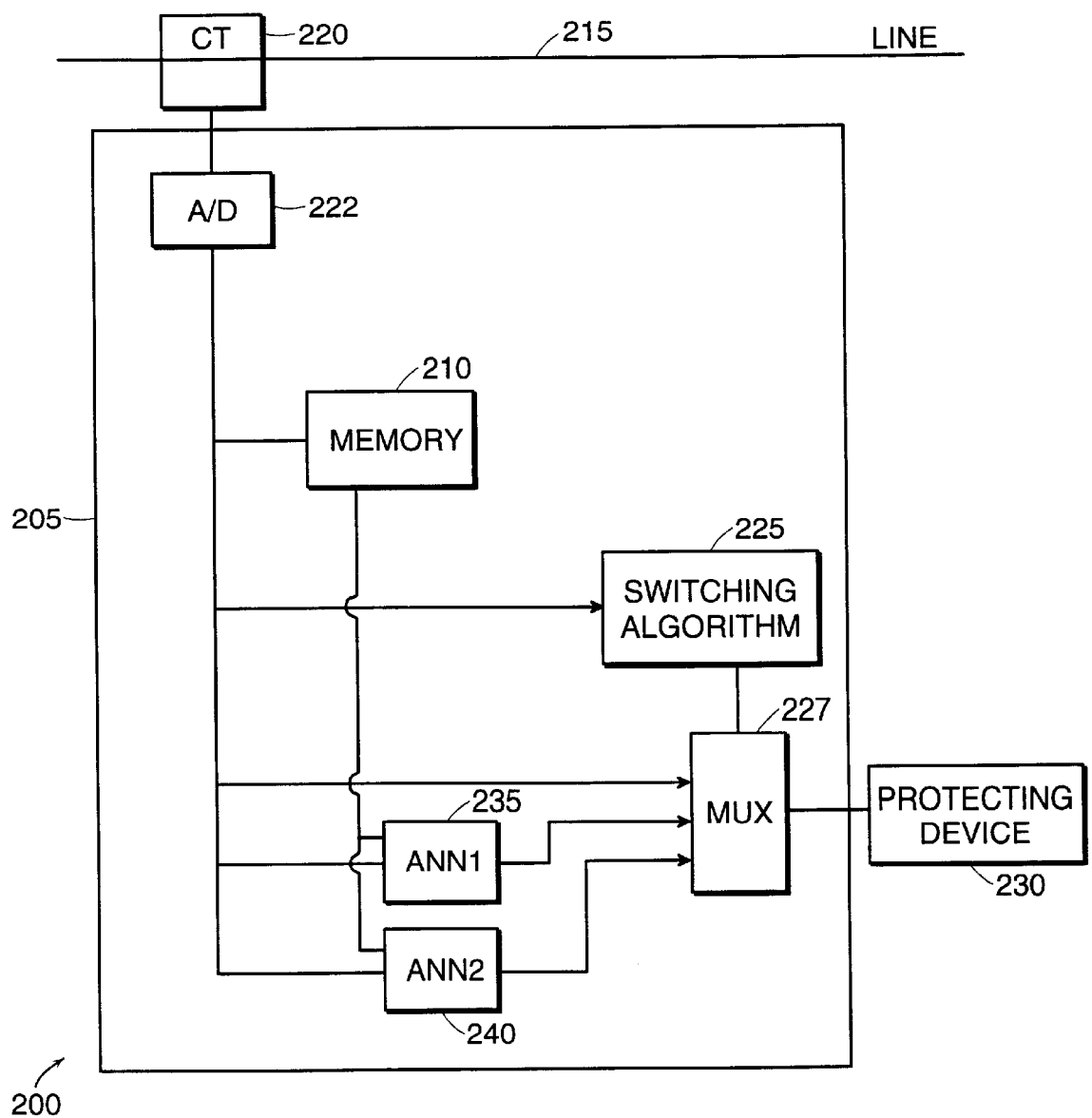
FIG. 2 is a block diagram of a protection system used to address CT saturation.

FIG. 2 shows a current protection system 200 which uses ANNs to correct for CT saturation. The system 200 may be implemented in digital electronic circuitry, in computer hardware, in firmware, in software, or as a combination of these elements. For example, FIG. 2 shows implementation of the system 200 as software running on a processor 205, such as a general purpose computer or a digital signal processor, having memory 210. For ease of description, subsequent discussions often refer to implementation of the system 200 using digital electronic circuitry. However, it should be understood that the system 200 may be implemented effectively using software or other approaches.

Referring again to FIG. 2, a line current 215 is measured by a CT 220 connected to receive the line current. An analog-to-digital converter 222 converts the current measurement from the CT 220 into a sequence of digital samples and supplies the digital sample to the computer 205.

A switching algorithm 225 running on the computer 205 monitors an instantaneous current level and determines within which of three ranges the current level falls. Dividing the wide range of potential fault currents into three narrower ranges improves accuracy of the estimate of the CT input. In a first range, the current is expected to be low enough so that no CT saturation will occur. In second and third ranges, the current may be high enough to produce CT saturation. When the switching algorithm 225 determines that the current level falls in the first range, the switching algorithm controls a multiplexer 227 to bypass the ANNs and send the current value directly to a protective device 230 such as a relay. When the switching algorithm 225 determines that the current level falls in the second range, the switching algorithm controls the multiplexer 227 to provide the output of a first ANN 235 to the protective device 230. When the switching algorithm 225 determines that the current level falls in the third range, the switching algorithm controls the multiplexer 227 to send the output of a second ANN 240 to the protective device 230. In other implementations, the switching algorithm 225 may control whether the ANNs are even employed with respect to a current sample. The memory 210 also receives the current samples.

Figure 3:
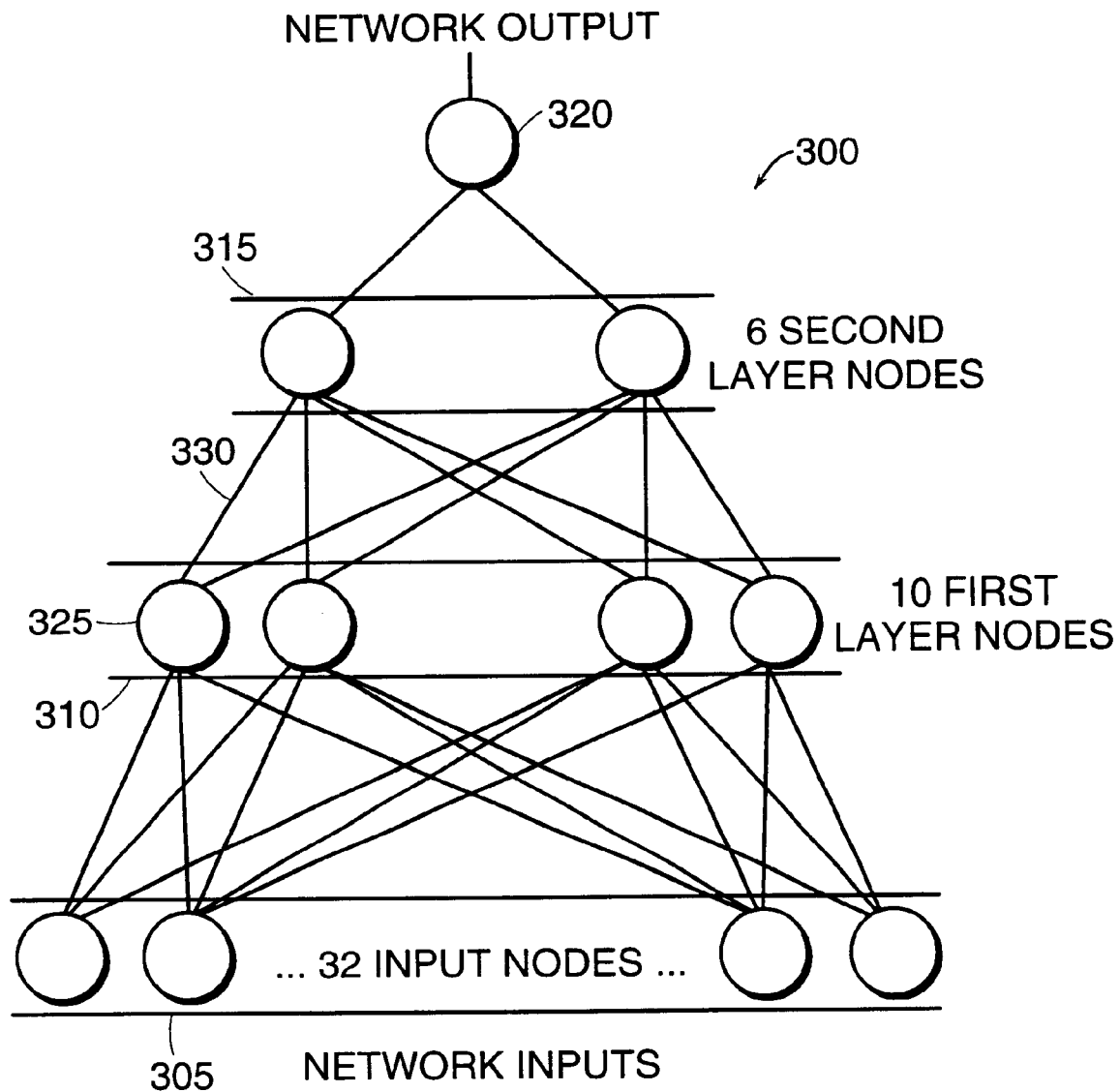
FIG. 3 is a block diagram of an artificial neural network (ANN) used for CT saturation compensation.

FIG. 3 illustrates the structure 300 of ANNs 235 and 240. The ANN structure is a feed-forward type network with an input layer 305, a first hidden layer 310, a second hidden layer 315, and an output layer 320. A feed-forward topology is used because of its simplicity and inherent stability. A node 325 is represented by an open circle in the structure 300 and a channel 330 is represented by a line which connects one node to another node. The input layer 305 has 32 input nodes. The number of input nodes is chosen based on a typical signal sampling rate of 32 samples per 60 Hz cycle. The first hidden layer 310 has ten nodes, and the second hidden layer 315 has six nodes. The output layer 320 has a single node.

Each of the nodes in the first hidden layer 310 accumulates a sum of samples presented at the input layer 305 multiplied by weighting factors for each channel. Once the sum is accumulated, it is operated on by the associated transfer function of the node, which is a non-linear tan-sigmoidal function represented by:

$$f(x) = \frac{1}{1+e^{-x}},$$

where x is the node input and f(x) is the node output.

Each node in the second hidden layer 315 sums weighted outputs of the nodes of the first hidden layer 310 and applies a non-linear tan-sigmoidal function to the sum. Similarly, the node in the output layer 320 accumulates a weighted sum of outputs of the six hidden nodes in the second hidden layer 315 and processes the sum through a tan-sigmoidal function.

Figure 4:
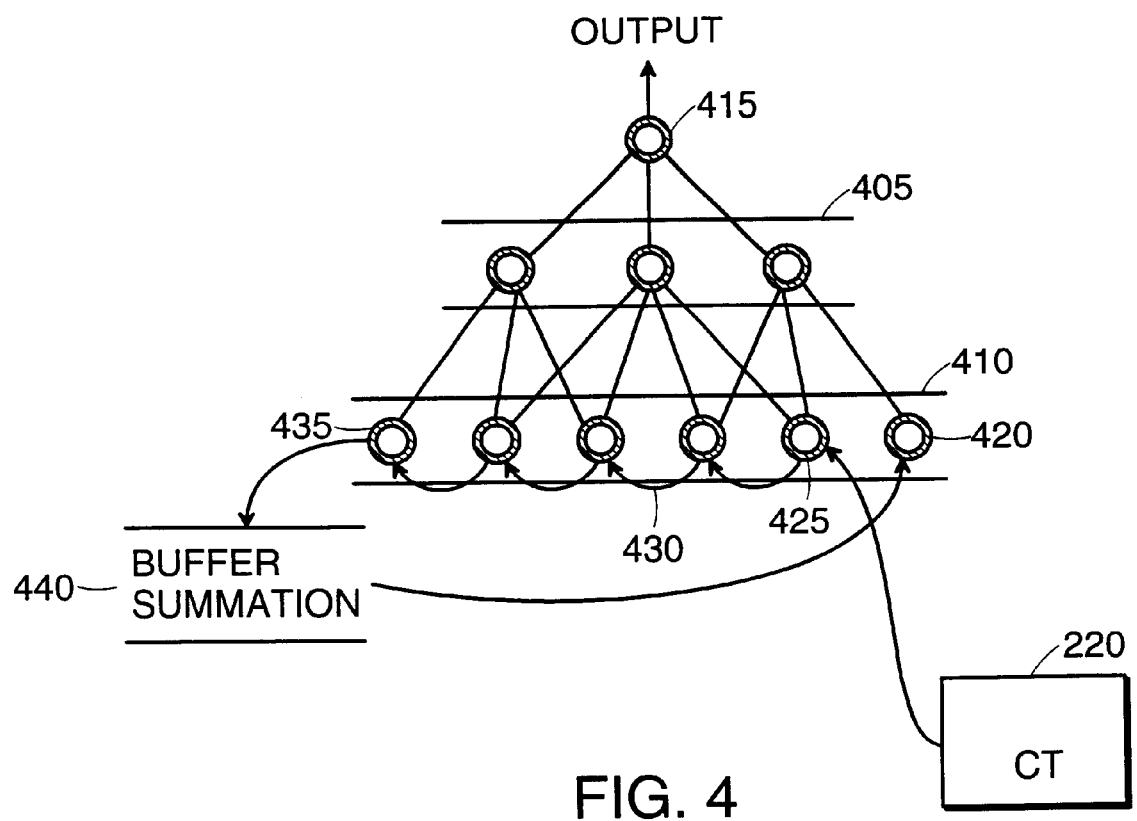
FIG. 4 is a simplified block diagram showing operation of an ANN.

Referring to FIG. 4, a simplified ANN uses a network structure including a three-node hidden layer 405, a six-node input layer 410, and an output node 415. For ease of description, in this simplified structure, the number of input nodes, six, may be based on a signal sampling rate of six samples per 60 Hz cycle. Since behavior of the CT in a cycle is dependent on a previous cycle, one input node 420 of the ANN receives a summation of the samples from the previous cycle. This summation is proportional to an integral of the secondary current and the flux during the previous cycle. Each new sample from the CT 220 is introduced to a "front" of the ANN at node 425. The previous sample is shifted down a node to the nearest node (shifting is represented by a curved arrow 430 connecting nodes in input layer). Samples from a last node 435 enter a six sample accumulator 440 which performs the summing and outputs the sum to node 420. The ANN runs for each new sample and thus produces a new output estimate for each sample. Thus, the ANN produces an estimate of the input of the CT based on a recent sample, previous four samples, and the summation of six previous samples preceding the previous four samples. The ANNs of FIG. 3 similarly operate on the current sample, the previous 30 samples, and the sum of the 32 samples preceding these 30 samples.

Figure 5:
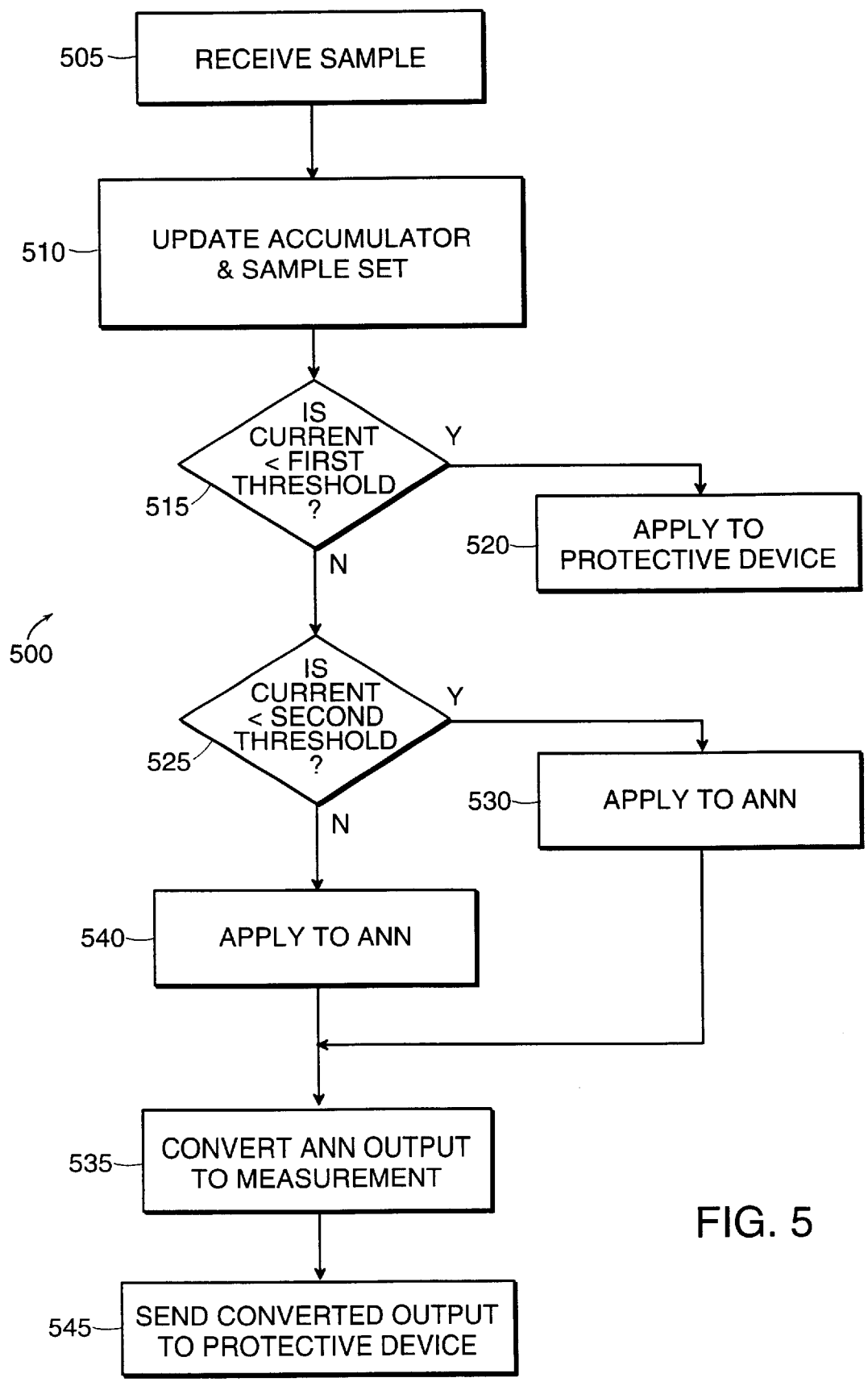
FIG. 5 is a flow chart of a procedure for using ANNs to compensate for CT saturation.

Referring to FIG. 5, the system 200 of FIG. 2 implements a procedure 500 for compensation of CT saturation. A sampled CT current is input from a power source (step 505). Samples are input to a sample set and the accumulator 440 is updated (step 510). Step 510 includes introducing each new sample to a first node 425 of the input layer 410, shifting the previous sample down a node in the input layer 315, providing the sample in the last node 435 to the accumulator 440 which sums the previous samples with the sample from node 435, and sending the result to node 420. A magnitude of the current sample is compared to a first threshold (step 515). If the current magnitude is less than the first threshold, then the signal is applied to the protective device 230 (step 520), and the ANN is bypassed. Since most protective devices make operating decisions based on the RMS value of a current, the protective device may include a calculation of the RMS value of the last 32 samples.

Next, the current magnitude is compared to a second threshold (step 525). If the current magnitude is less than the second threshold, then ANN 235 is applied using an appropriate set of channel weight factors (step 530). The output of the ANN is an estimate of the true CT input current. This estimate is converted to a corresponding current measurement using an ideal transfer function for the CT (step 535). If the current magnitude is greater than or equal to the second threshold, then the ANN 240 is applied using an appropriate set of channel weight factors (step 540). The output of the ANN is an estimate of the true CT input current. This estimate is converted to a corresponding current measurement using the ideal transfer function for the CT (step 535). The converted output is applied to the protective device (step 545).

The ANN is trained using MATLAB with data from EMTP simulations and data generated from actual CTs. The ANN is not trained for unsaturated faults, since these are handled by the protective device 230 without use of the ANN. Thus, only values representing the second and third ranges are used in training since the first range involves unsaturated CT signals and no correction is needed. The switching algorithm 225 described in FIGS. 2 and 5 ensures that the ANN 235 or 240 is bypassed for unsaturated faults.

Figure 6:
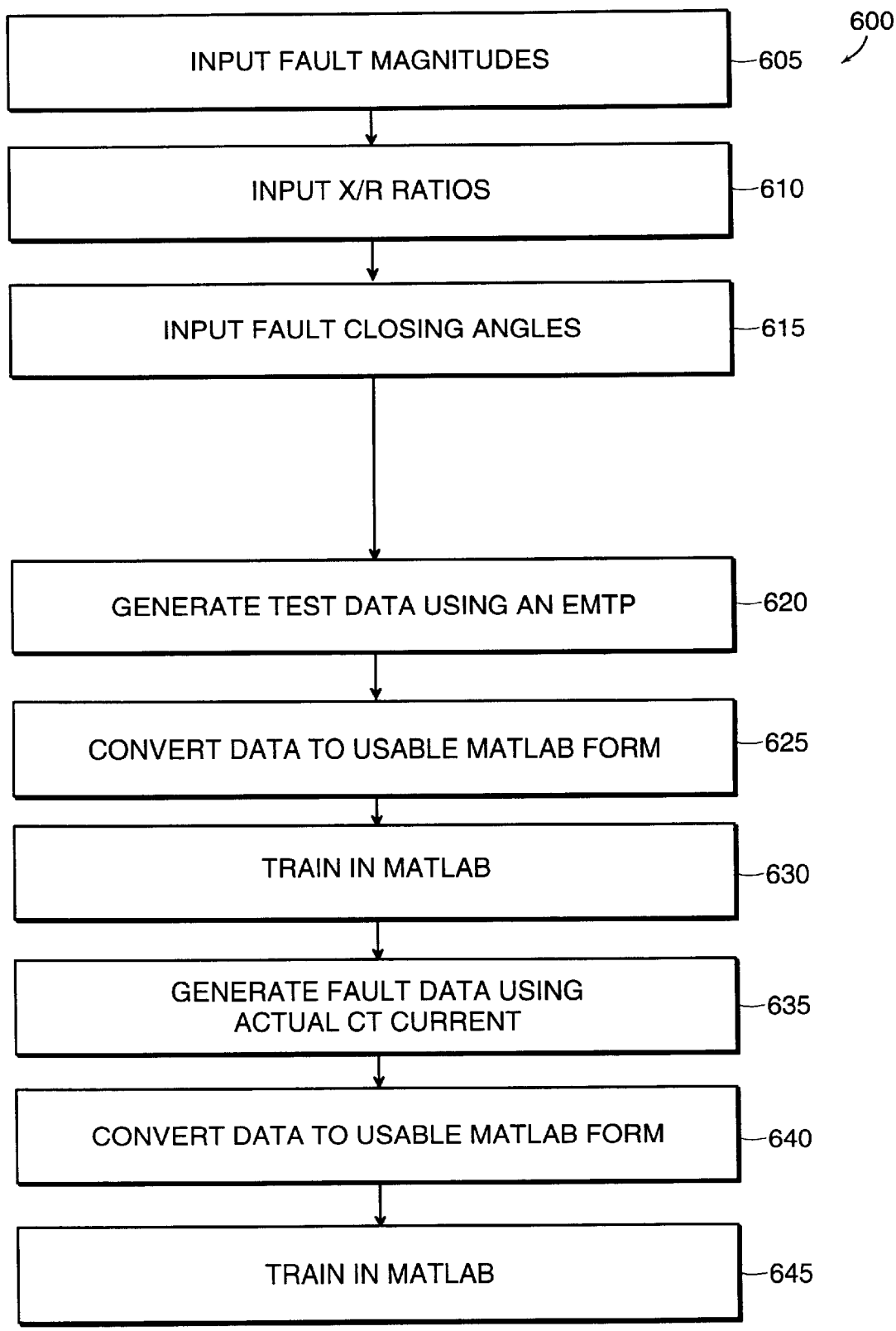
FIG. 6 is a flow chart of an ANN training procedure.

FIG. 6 shows a flow chart of an ANN training procedure 600. A range of training cases are defined and the ANN is applied for each case. Variables for the test cases include fault magnitude, X/R ratio, and fault closing angle. The X/R ratio represents a level of DC offset. The fault closing angle represents the direction of the DC offset—either positive or negative with respect to the zero value of a symmetrical fault. The range of training cases is chosen to cover an expected operation of the CT. For a 1000:1 A CT, for example, fault magnitudes of 5, 8, 10, 13, and 15 kA RMS symmetrical are input into the training procedure 600 (step 605). For high X/R ratios, peak currents of almost two times those of symmetrical faults are possible. For the purposes of training, X/R ratios of 5, 10, and 20 may be input into the training procedure 600 (step 610). In one implementation, four unique test cases, with fault closing angles 90 degrees apart, are generated and input into the training procedure 600 (step 615).

Figure 7:
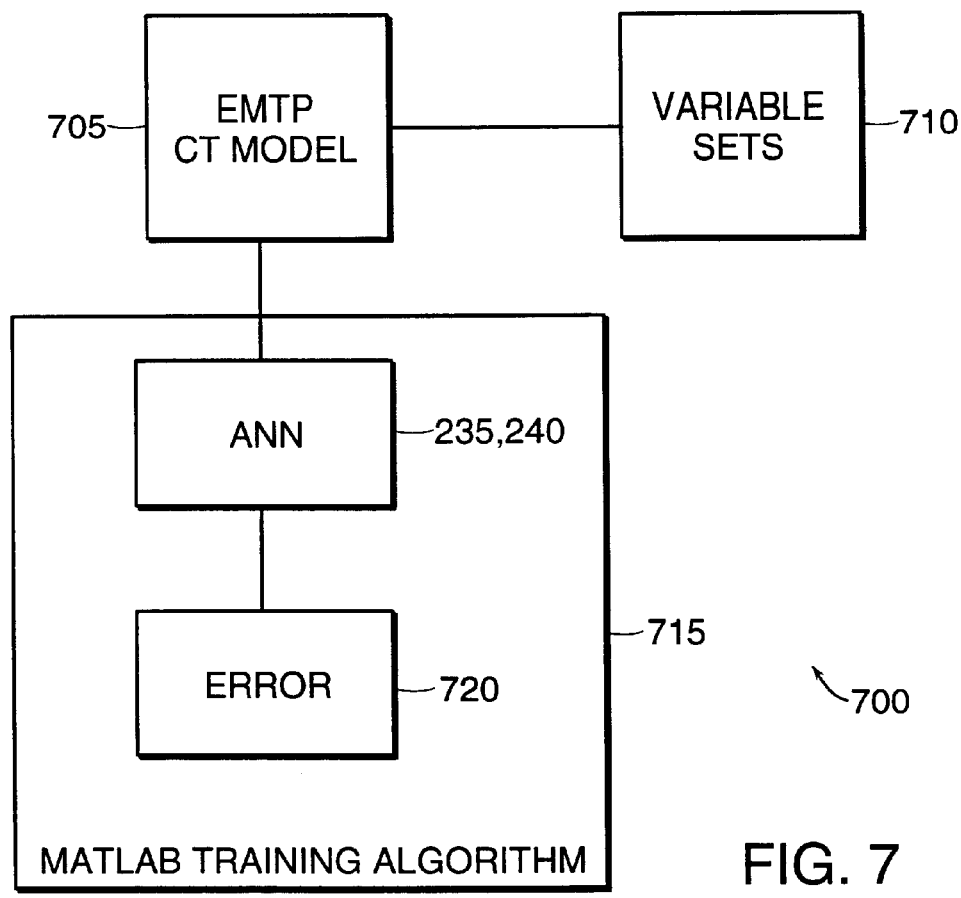
FIG. 7 is a block diagram of an Electro Magnetic Transient Program (EMTP) simulation system used in the training system.
Figure 8:
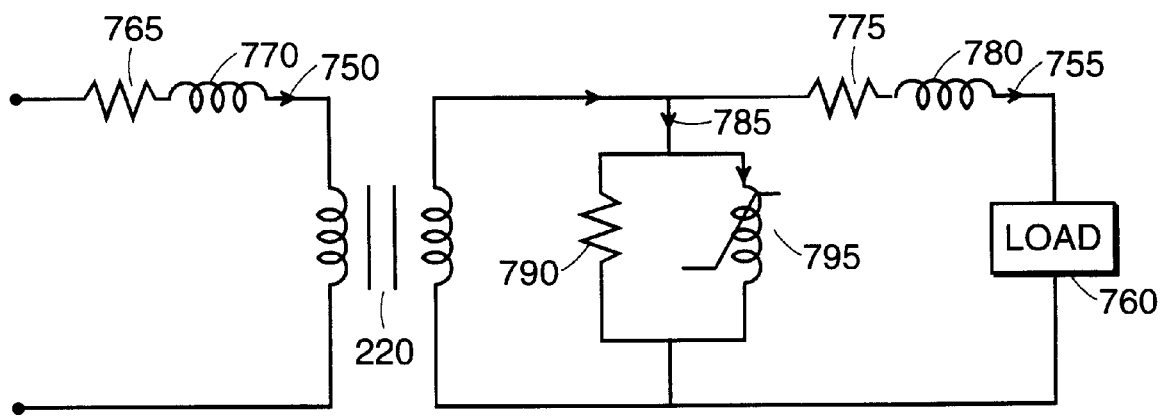
FIG. 8 is a circuit diagram of a CT model used in the EMTP of FIG. 7.

ANN training is accomplished when the ANN provides the inverse of the CT transfer function. When this occurs, the ANN is trained and may be used to estimate the input of the CT. Combining all three variable sets, there may be about 40 cases to train the ANN. After the test cases are defined by entering the fault magnitudes, X/R ratios, and fault closing angles, test data is generated using an Electro Magnetic Transient Program (EMTP) (step 620). Referring also to FIG. 7, an EMTP training system 700 includes an EMTP 705 that receives variable sets 710 providing the test cases for the EMTP 705. The EMTP 705 simulates response of the CT by modelling CT behavior based on an equivalent circuit diagram shown in FIG. 8. Referring to FIG. 8, a primary current 750 in an ideal CT 220 induces a secondary current 755 in the ideal CT 220 which is loaded with some impedance 760. Resistance 765 and leakage inductance 770 in the primary winding and resistance 775 and leakage inductance 780 in the secondary winding are represented in FIG. 8 as well. An exciting or magnetizing current 785 is dependent on a magnetizing impedance, which is represented by an iron loss equivalent resistance 790 in parallel with a magnetizing non-linear inductance 795.

Data from the EMTP must be converted to a form usable by a MATLAB training algorithm 715 (step 625). Training is conducted until an error 720 between modelled CT currents and ANN-estimated currents reaches an acceptable level (step 630).

After the basic operation of the ANN is confirmed using EMTP, fault cases are generated using actual CT primary and secondary currents recorded in digital form (step 635). The data is converted to a format usable by MATLAB (step 640) and then the ANN is trained (step 645) using the actual CT data.

Figure 9:
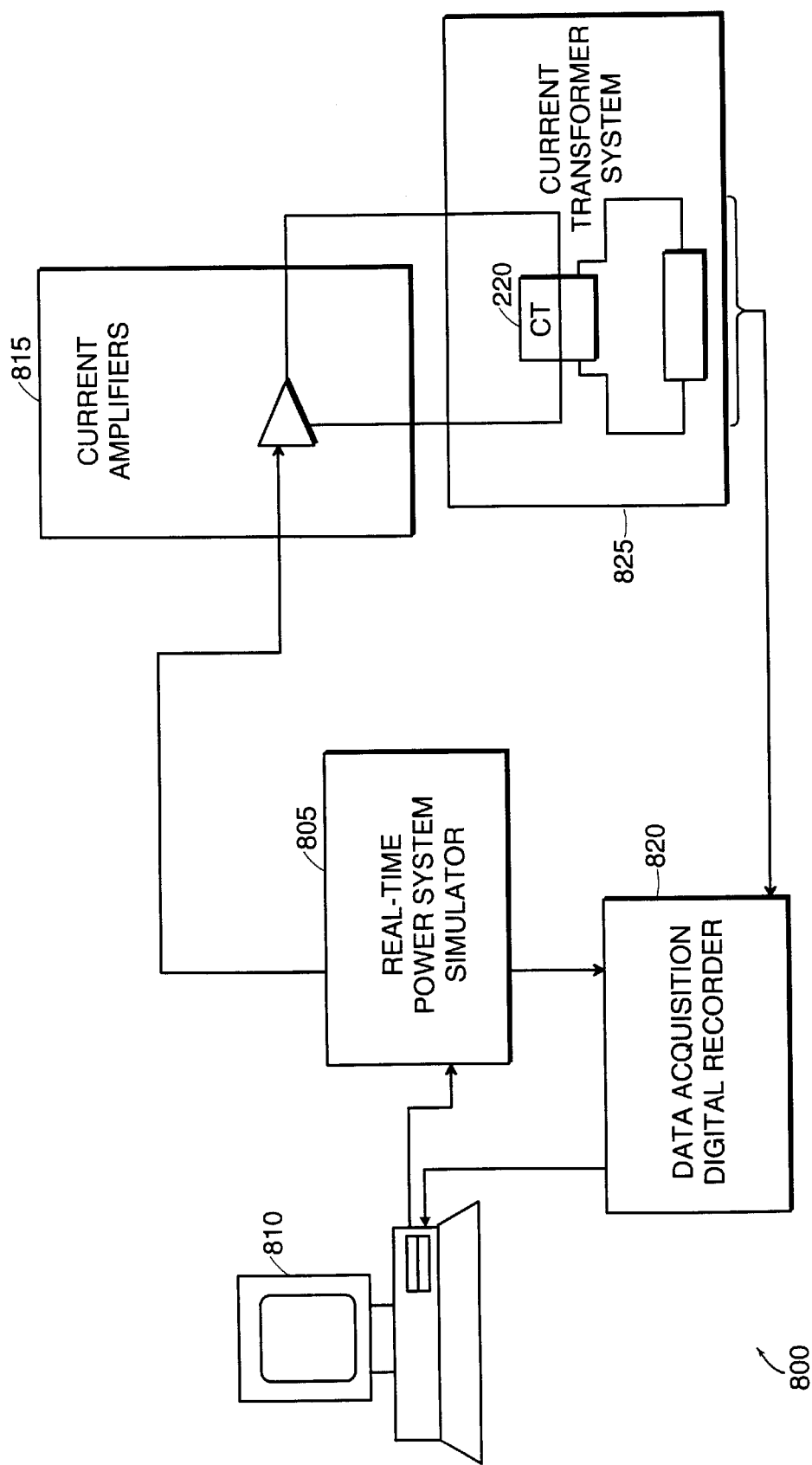
FIG. 9 is a block diagram of a CT testing system which uses data from a real-time power system simulator (RTPSS).

FIG. 9 shows a CT testing system 800 which uses data generated from an actual CT 220. To obtain test data, a real-time power system simulator (RTPSS) 805 is used to accurately simulate real power system operation. The RTPSS 805 is controlled using a computer 810. Furthermore, it is an analog-based device which employs high fidelity voltage and current amplifiers 815 which simulate high fault currents which may contain DC offset. With appropriate data acquisition techniques, CT primary and secondary currents are recorded using a digital recorder 820. A test system 825, similar to the protection system 200 of FIG. 2, is used to determine within which range a current level falls. Thus, if the fault current is below a first threshold, the ANN is bypassed and if the fault current is above the first threshold, the ANN (with appropriate weight factors) is implemented to estimate the CT current. ANN output is compared to the input generated by the RTPSS 805 and trials continue until the difference is below an acceptable level.

Once training is finished, the protection system 200 may be tested using actual CT data generated from the RTPSS 805 of FIG. 9. Several test cases, with various offsets and fault magnitudes, are performed using MATLAB.

Figure 10:
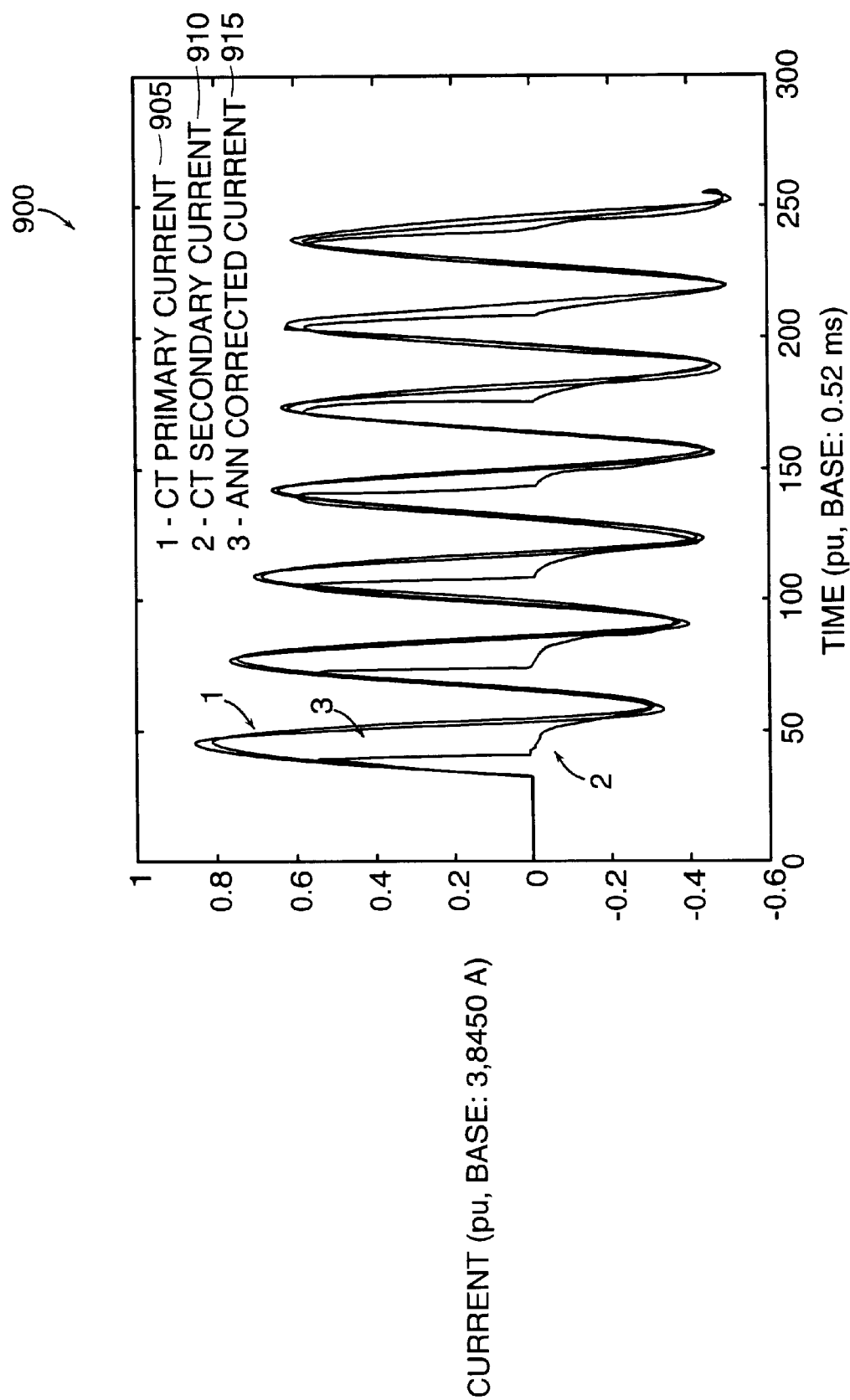
FIG. 10 is a graph of a first test case of the protection system.

FIG. 10 shows a graph 900 of primary CT current 905, secondary CT current 910, and ANN output 915 of a first test case in which a high fault current with positive-going DC offset causes significant CT saturation and results in secondary current distortion. The fault current exceeds the second threshold, and, therefore, is processed by ANN 240. As evidenced in graph 900, the CT error correction by ANN 240 is in agreement with primary CT current 905.

Figure 11:
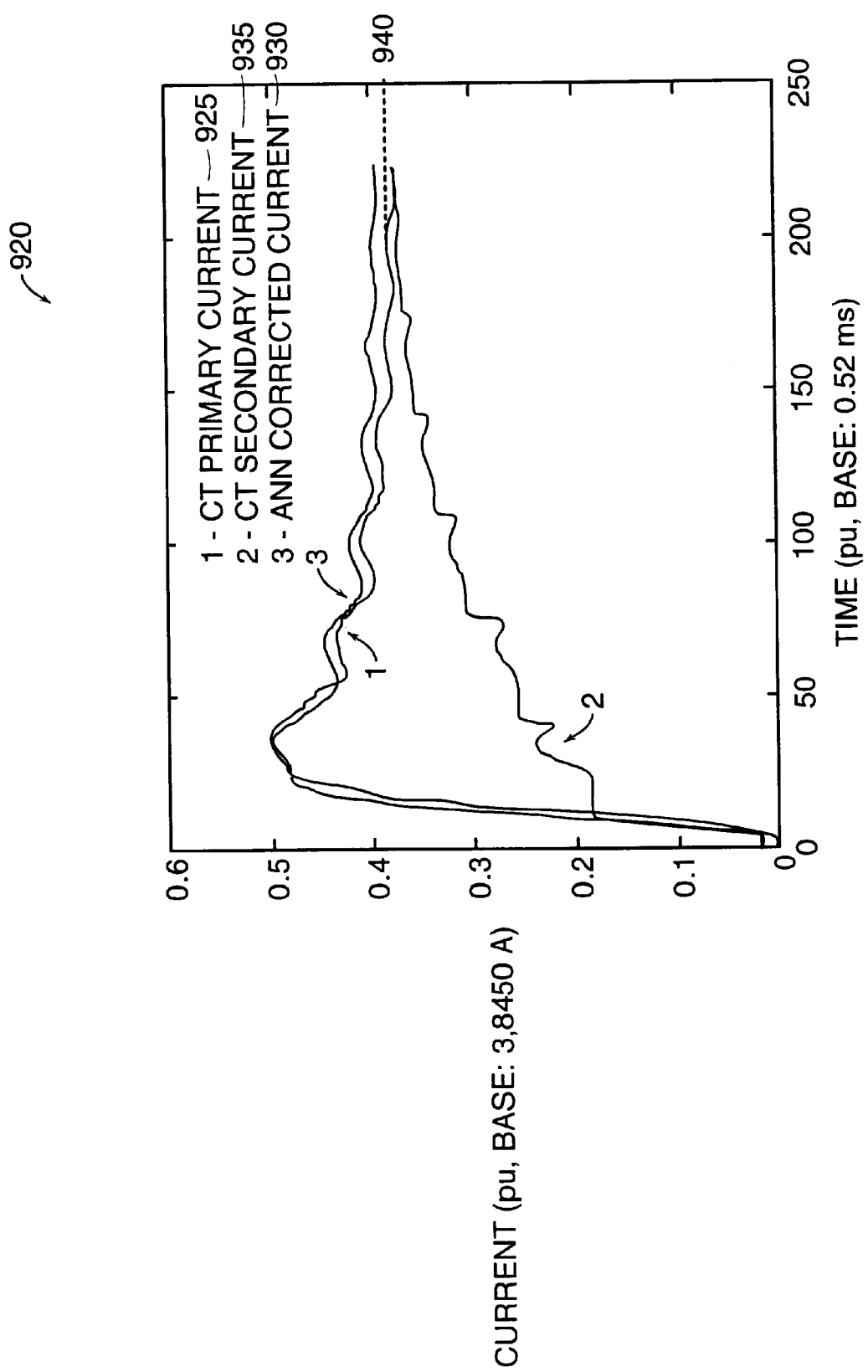
FIG. 11 is a graph of root-mean square (RMS) values of the waveforms of FIG. 10.

FIG. 11 shows a graph 920 of RMS values of the same waveforms of FIG. 10. RMS values are calculated by the protective device 230 using the following equation:

$$\text{RMS} = \sqrt{\left[\frac{1}{N}\sum_{1}^{N} x^2(n)\right]},$$

where N=32 (the number of samples in a cycle), and x(n) is the previous $n^{th}$ sample. The calculation of RMS is carried out over one cycle's worth of samples (32 samples) and performed several times per cycle. RMS values of the primary CT current 925 are in good agreement with RMS values of the ANN corrected current 930. RMS values of the secondary CT current 935 display the effects of CT saturation shown in FIG. 10. The RMS value increases to an asymptotic value 940 of the fault after one cycle.

Figure 12:
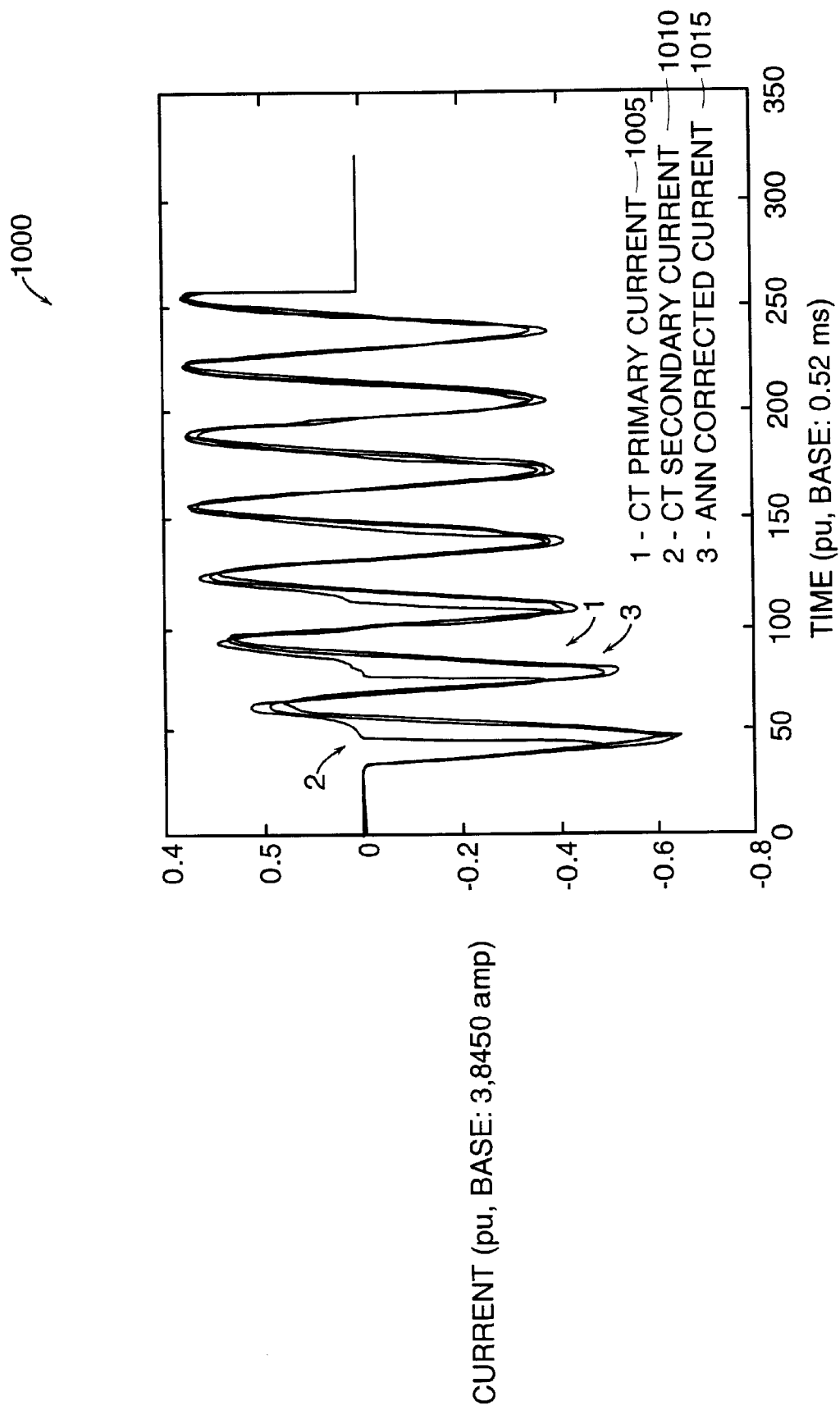
FIG. 12 is a graph of a second test case of the protection system.

FIG. 12 shows a graph 1000 of primary CT current 1005, secondary CT current 1010, and ANN output 1015 of a second test case in which a fault current with negative-going DC offset caused CT saturation and resulted in secondary current distortion. The fault current exceeded the first threshold but not the second threshold, thus it was processed by ANN 235. As evidenced in graph 1000, the CT error correction by ANN 235 is in agreement with primary CT current 1005.

Figure 13:
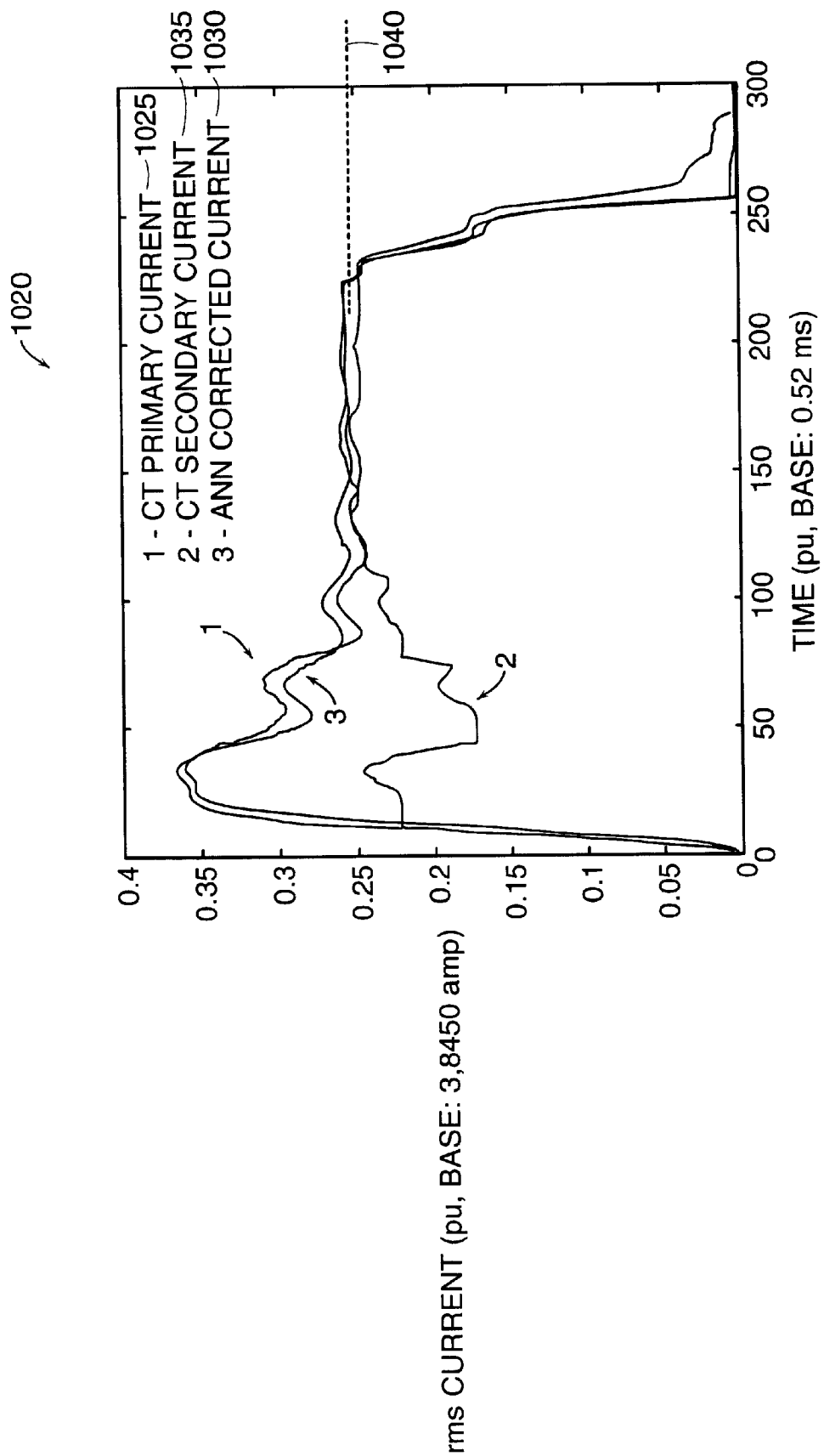
FIG. 13 is a graph of root-mean square (RMS) values of the waveforms of FIG. 12.

FIG. 13 shows a graph 1020 of RMS values of the same waveforms of FIG. 12. RMS values of the primary CT current 1025 are in good agreement with RMS values of the ANN corrected current 1030. RMS values of the secondary CT current 1035 display the effects of CT saturation shown in FIG. 12. The RMS value increases to an asymptotic value 1040 of the fault after one cycle.

Results of all test cases, including those in FIGS. 10–13, show that the protection system 200 successfully estimates the true primary CT current from a saturated secondary CT output under realistic fault conditions.

Figure 14:
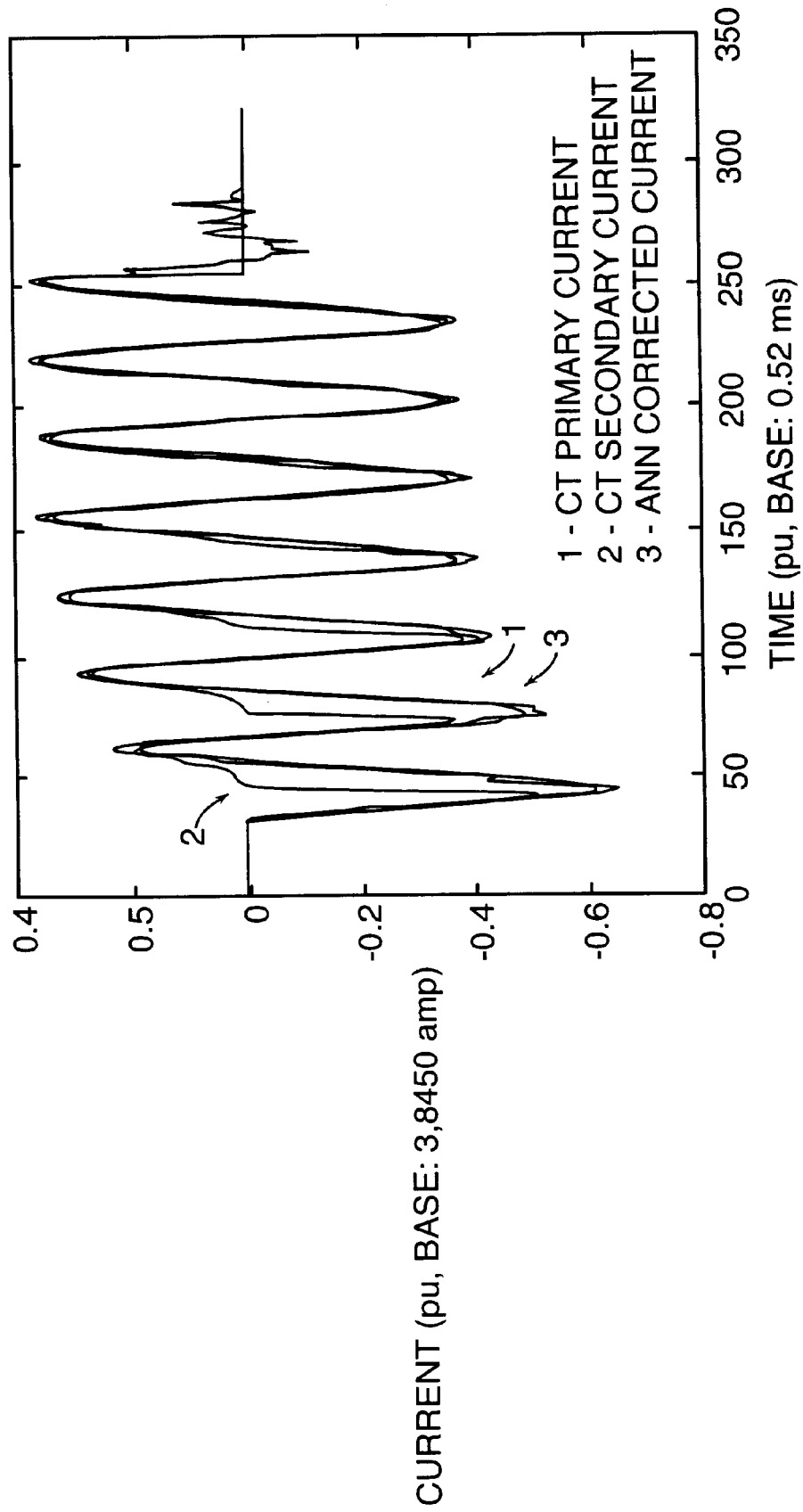
FIGS. 14 and 15 are graphs of a digital signal processor (DSP) simulation using the second test case of FIGS. 12 and 13.
Figure 15:
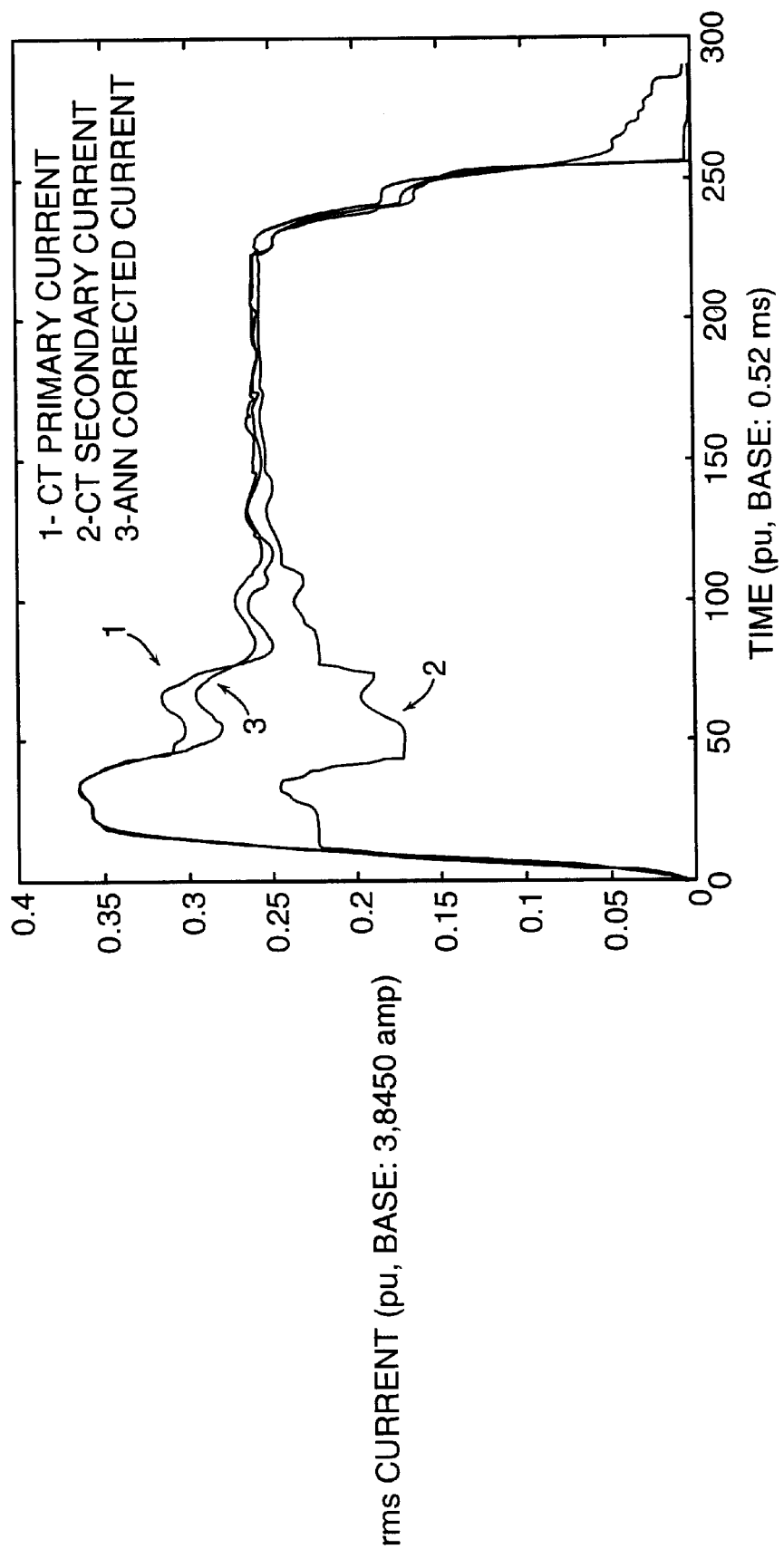

To verify that the protection system 200 may be applied in real-time, the algorithm 225 was implemented on a digital signal processor (DSP). The algorithm 225 was coded in DSP assembly language and was then run on a DSP simulator. The DSP simulator accurately simulated the performance of a real DSP processor. Testing of the algorithm was done using a PC-based DSP simulator for the processor which reads saved data files from actual CTs and writes output files which are analyzed for error. FIGS. 14 and 15 show the same test case as FIGS. 12 and 13 processed on the DSP simulator using a fixed-point arithmetic in the algorithm. Results from the DSP simulator (FIGS. 14 and 15) are in good agreement with results from MATLAB (FIGS. 12 and 13). Furthermore, results from the DSP simulation indicate that the total algorithm 225 may be executed within 130 µs per sample per phase of signal and may require less than 1.1 K of memory.

Other embodiments are within the scope of the following claims.

What is claimed is:

1. A method of correcting for saturation in a current transformer used to provide a current measurement, the method comprising:
   receiving a current measurement from the current transformer; and
   providing the current measurement to an artificial neural network, the artificial neural network being trained to implement an inverse transfer function of the current transformer and producing an output that accounts for saturation of the current transformer.

2. The method of claim 1, further comprising converting the output of the artificial neural network to a projected current measurement using an ideal transfer function for the current transformer.

3. The method of claim 2, further comprising providing the projected current measurement to a protective device.

4. The method of claim 3, wherein the protective device signals a relay to trip if the projected current measurement is greater than a predetermined value.

5. The method of claim 1, further comprising providing the current measurement to another artificial neural network if the current measurement is greater than a predetermined threshold, the other artificial neural network being trained to implement an inverse transfer function of the current transformer and producing an output that accounts for saturation of the current transformer.

6. The method of claim 5, further comprising converting the output of the other artificial neural network to a projected current measurement using an ideal transfer function for the current transformer.

7. The method of claim 6, further comprising providing the projected current measurement to a protective device, wherein the protective device signals a relay to trip if the projected current measurement is greater than a predetermined value.

8. The method of claim 1, further comprising bypassing the artificial neural network if the current measurement is less than a first threshold.

9. The method of claim 8, further comprising providing the current measurement to a protective device when the artificial neural network is bypassed.

10. The method of claim 9, wherein the protective device signals a relay to trip if the current measurement is greater than a predetermined value.

11. The method of claim 1, wherein receiving the current measurement includes converting the current measurement into a sequence of digital samples.

12. The method of claim 1, further comprising training the artificial neural network using data from Electro Magnetic Transient Program simulations.

13. The method of claim 1, further comprising training the artificial neural network using data from actual current transformers.

14. The method of claim 1, wherein a first input of the artificial neural network comprises the current measurement, and a second input of the artificial neural network comprises a previous current measurement.

15. The method of claim 14, wherein a third input of the artificial neural network comprises a combination of previous current measurements.

16. The method of claim 1, further comprising:
   monitoring the current measurement; and
   determining within which of a plurality of ranges the current measurement falls.

17. The method of claim 16, further comprising:
   if the current measurement falls in a first range, bypassing the artificial neural network and providing the current measurement directly to a protective device;

if the current measurement falls in a second range, providing the current measurement to a first artificial neural network; and if the current measurement falls in a third range, providing the current measurement to a second artificial neural network.

18. A current transformer saturation correction apparatus used in a power system, the apparatus comprising:

a current transformer; and an artificial neural network connected to receive an output of the current transformer and trained to implement an inverse transfer function of the current transformer, the artificial neural network providing an output that accounts for saturation of the current transformer.

19. The apparatus of claim 18, further comprising a protective device connected to receive the output of the artificial neural network.

20. The apparatus of claim 18, further comprising a second artificial neural network connected to receive an output of the current transformer and trained to implement an inverse transfer function of the current transformer, the second artificial neural network providing an output that accounts for saturation of the current transformer.

21. The apparatus of claim 20, further comprising a switching system which monitors the current measurement and determines within which of a plurality of ranges the current measurement falls.

22. The apparatus of claim 21, wherein when the current measurement falls in a first range, the output of the current transformer is provided directly to a protective device and the artificial neural networks are bypassed.

23. The apparatus of claim 21, wherein when the current measurement falls in a second range, the output of the current transformer is provided to the first artificial neural network.

24. The apparatus of claim 23, further comprising a converter that converts an output of the artificial neural network to a projected current measurement using an ideal transfer function for the current transformer.

25. The apparatus of claim 24, further comprising a protective device connected to receive the projected current measurement.

26. The apparatus of claim 21, wherein when the value falls in a third range, the output of the current transformer is provided to the second artificial neural network.

27. The apparatus of claim 18, further comprising an analog-to-digital converter which converts the current measurement into a sequence of digital samples.

* * * * *